United States Patent [19]

Choi et al.

[11] Patent Number: 5,450,159
[45] Date of Patent: Sep. 12, 1995

[54] IMAGE FORMING APPARATUS

[75] Inventors: Min-ho Choi; Jong-heui Kim, both of Suwon-city, Rep. of Korea

[73] Assignee: Samsung Electronics Co., Ltd., Kyungki-do, Rep. of Korea

[21] Appl. No.: 170,875

[22] Filed: Dec. 21, 1993

[30]    Foreign Application Priority Data

Jul. 27, 1993 [KR]  Rep. of Korea ............... 1993-14296

[51] Int. Cl.6 .......................................... G03G 15/00
[52] U.S. Cl. ...................................... 355/200; 355/245
[58] Field of Search ............... 355/200, 210, 211, 260, 355/215, 245, 202

[56]    References Cited

U.S. PATENT DOCUMENTS

| | | | |
|---|---|---|---|
| 4,873,940 | 10/1989 | Ishikawa et al. | 118/651 |
| 4,996,566 | 2/1991 | Morita et al. | 355/246 |
| 5,019,861 | 5/1991 | Surti | 355/200 |
| 5,095,335 | 3/1992 | Watanabe et al. | 355/210 |
| 5,126,788 | 6/1992 | Koga | 355/200 |
| 5,155,523 | 10/1992 | Hara et al. | 355/53 |
| 5,166,731 | 11/1992 | Aimoto et al. | 355/215 |
| 5,283,619 | 2/1994 | Nomara et al. | 355/261 |

*Primary Examiner*—A. T. Grimley
*Assistant Examiner*—Thu A. Dang
*Attorney, Agent, or Firm*—Leydig, Voit & Mayer

[57]    ABSTRACT

In an image forming apparatus, a photosensitive drum, laser scanning unit, developing unit, and transfer unit are installed in a housing separate from a main body and a buffer between and connected to the housing and the main body for absorbing vibration.

6 Claims, 4 Drawing Sheets

IMAGE FORMING APPARATUS

BACKGROUND OF THE INVENTION

The present invention relates to an image forming apparatus, and more particularly, to an image forming apparatus in which the installation structure of a laser scanning unit, a photosensitive drum and a transfer unit is improved to prevent their vibration.

In a conventional image forming apparatus such as a color printer or color copier, in order to reduce internally created vibration and driving error, a flywheel is installed on one side of a rotator without an additional buffer so that the moment of inertia is raised. This is, however, a passive design. An expensive precision motor may also be employed. Such conventional modes have been used with limited improvement, and as a result, they have problems of jitter, color blurring or color smearing.

FIG. 1 shows such a conventional image forming apparatus.

Referring to FIG. 1, the apparatus includes a paper carrier 2 having a roller 3 and a guide plate 4 which together convey sheets of paper to a main body 1, a photosensitive drum 5, a laser scanning unit 6 for emitting a laser beam to photosensitive drum 5 to form an electrostatic latent image, a developing unit 7 for supplying toner to the electrostatic latent image formed on photosensitive drum 5, a transfer unit 8 for transferring the toner supplied to photosensitive drum 5 to the paper, and a fixing unit 9 for fixing the toner transferred onto the paper. Such an apparatus has no additional buffer.

In the conventional image forming apparatus, since the components are all located in the main body, during the driving of the components, the vibration created by the paper carrier or fixing unit is transmitted to the laser scanning unit, photosensitive drum and transfer unit which affects image quality.

Due to the vibration, the position or the laser beam of the laser scanning unit is altered, impeding the electrostatic latent image from being precisely formed on the photosensitive drum, and the image formed on the photosensitive drum with toner cannot be precisely transferred to a sheet of paper. This creates color blurring or color smearing, deteriorating image quality.

In addition, due to the vibration, toner is scattered in the apparatus when the toner is supplied from the developing unit to the photosensitive drum. This contaminates the apparatus.

SUMMARY OF THE INVENTION

Therefore, it is an object of the present invention to provide an image forming apparatus in which the installation structure of a laser scanning unit, a photosensitive drum and a transfer unit is improved to prevent their vibration.

It is another object of the present invention to provide an image forming apparatus the installation structure of which is improved so as to protect a developing unit from vibration and to thereby minimize the scattering of toner during the operation of the developing unit.

To accomplish the first object, there is provided an image forming apparatus comprising a photosensitive drum, a laser scanning unit for forming an electrostatic latent image on the photosensitive drum, a developing unit for applying toner on the electrostatic latent image to form an image with the toner, a transfer unit for transferring the image with toner onto a sheet of paper, and a main body, wherein the photosensitive drum, laser scanning unit and transfer unit are installed in a housing separate from the main body, and a buffer is provided between the housing and main body.

To accomplish the second object, there is provided an image forming apparatus comprising a photosensitive drum, a laser scanning unit for forming an electrostatic latent image on the photosensitive drum, a developing unit for applying toner on the electrostatic latent image to form an image with the toner, a transfer unit for transferring the image with toner onto a sheet of paper, and a main body, wherein the photosensitive drum, laser scanning unit, transfer unit and developing unit are installed in a housing separate from the main body, and a buffer is provided between the housing and main body.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
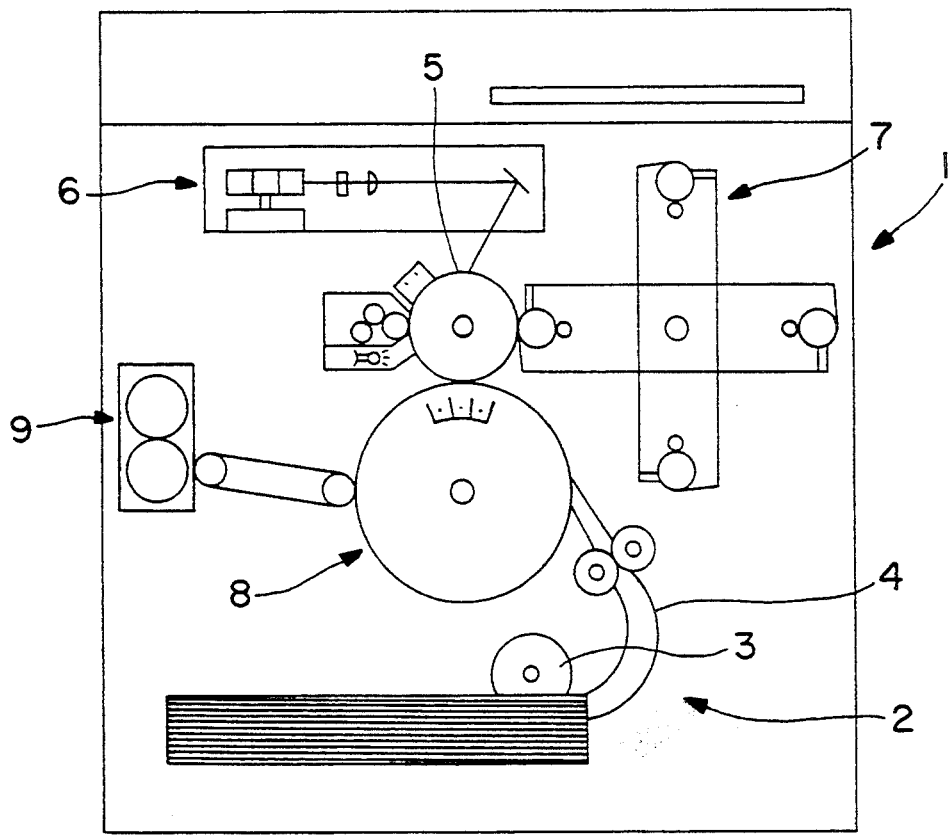
FIG. 1 is a schematic cross-sectional view of a conventional image forming apparatus.
Figure 2:
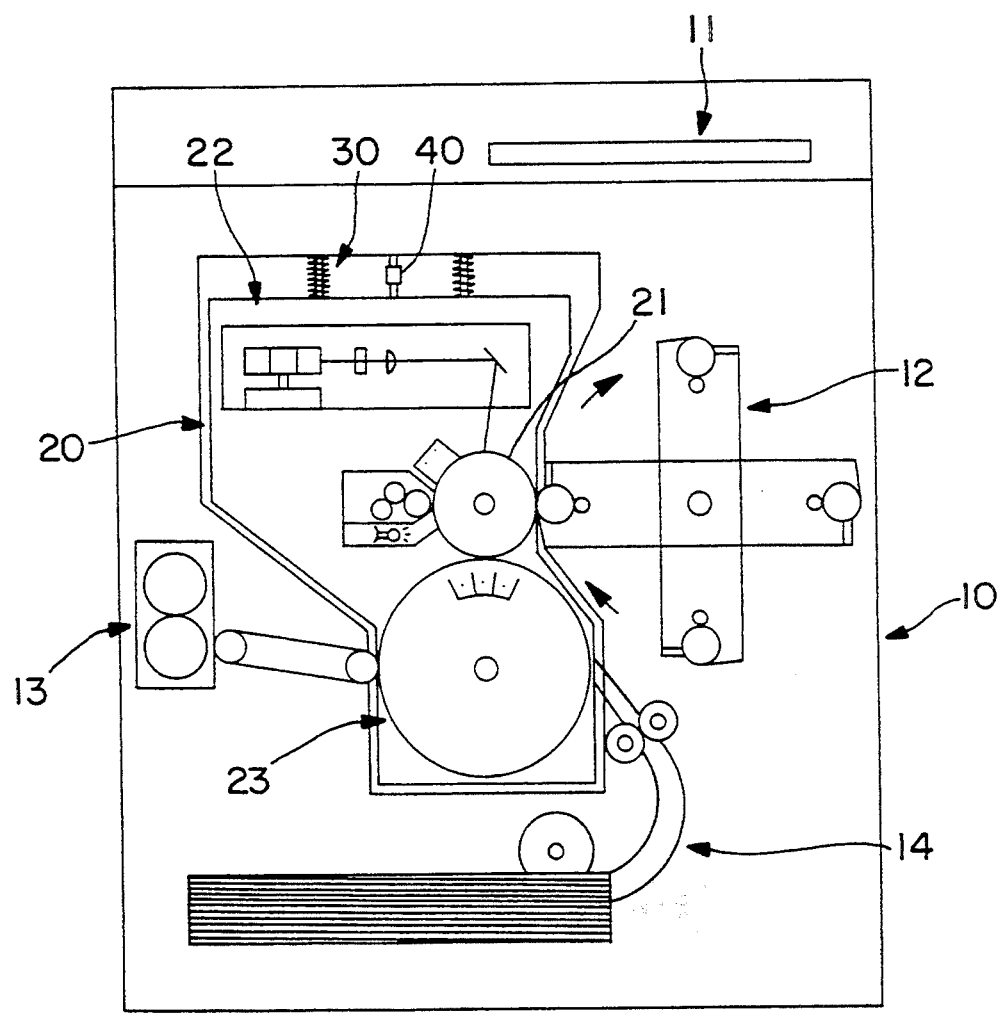
FIG. 2 is a schematic cross-sectional view of one embodiment of an image forming apparatus of the present invention.

Referring to FIG. 2, the image forming apparatus of the present invention comprises a scanner 11 for reading out an image on a sheet of paper, a developing unit 12 for supplying toner to a photosensitive drum 21 to form an image with the toner, a fixing unit 13 for fixing the toner transferred to the paper, and a paper carrier 14. The above members are located inside a main body 10.

A housing 20, which is separate from main body 10, is disposed inside main body 10. Housing 20 contains a photosensitive drum 21, a laser scanning unit 22 for emitting a laser beam so as to form an electrostatic latent image on photosensitive drum 21, and a transfer unit 23 for transferring to the paper the toner supplied from developing unit 12 to photosensitive drum 21.

Between housing 20 and main body 10 are provided a buffer 30 for absorbing the vibration created from the main body, and a damper 40 for absorbing the vibration of buffer 30.

Figure 3:
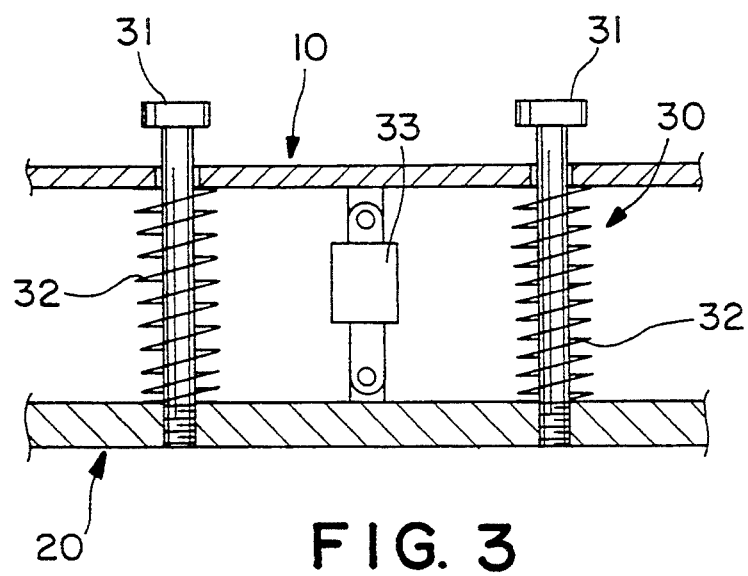
FIG. 3 is an enlarged cross-sectional view of the buffer of the apparatus shown in FIG. 2.

As shown in FIG. 3, buffer 30 is fabricated so as to have a buffer spring 32 wound around a support axle 31 for supporting housing 20 on main body 10. The ends of the buffer spring are fastened to main body 10 and housing 20. A damper 33 has ends fixed to main body 10 and housing 20, respectively.

Figure 4:
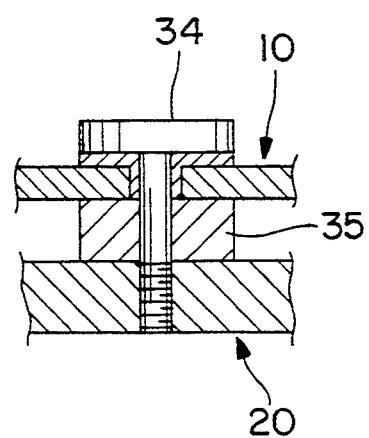
FIG. 4 is another embodiment of the buffer of the present invention.

Referring to FIG. 4 showing another embodiment of buffer 30 of the present invention, buffer 30 is composed of an elastic member 35 interposed between housing 20 and main body 10 and retained by a set screw 34 for supporting the housing on main body 10. For elastic member 35, a rubber buffer is preferably used.

In the image forming apparatus of the present invention, since photosensitive drum 21, laser scanning unit 22 and transfer unit 23 are installed in housing 20 which is separate from main body 10 and buffer 30 is provided between housing 20 and main body 10, less vibration created due to the driving of paper carrier 14, fixing unit 13 and developing unit 12, which are directly installed onto main body 10, is transmitted to housing 20.

Specifically, if buffer 30 is made of elastic member 35, the vibration caused by the driving of paper carrier 14, fixing unit 13 and developing unit 12 is absorbed by elastic member 35. If buffer 30 is composed of buffer spring 32 and damper 33, the vibration caused by the driving of paper carrier 14, fixing unit 13 and developing unit 12 is first reduced by buffer spring 32, and the vibration of buffer spring 32 is again attenuated by damper 40.

Accordingly, the image forming apparatus of the present invention can prevent photosensitive drum 21, laser scanning unit 22 and transfer unit 23, which determine image quality, from the vibration transmitted from main body 10, to thereby minimize color blurring or color smearing caused by the vibration.

Figure 5:
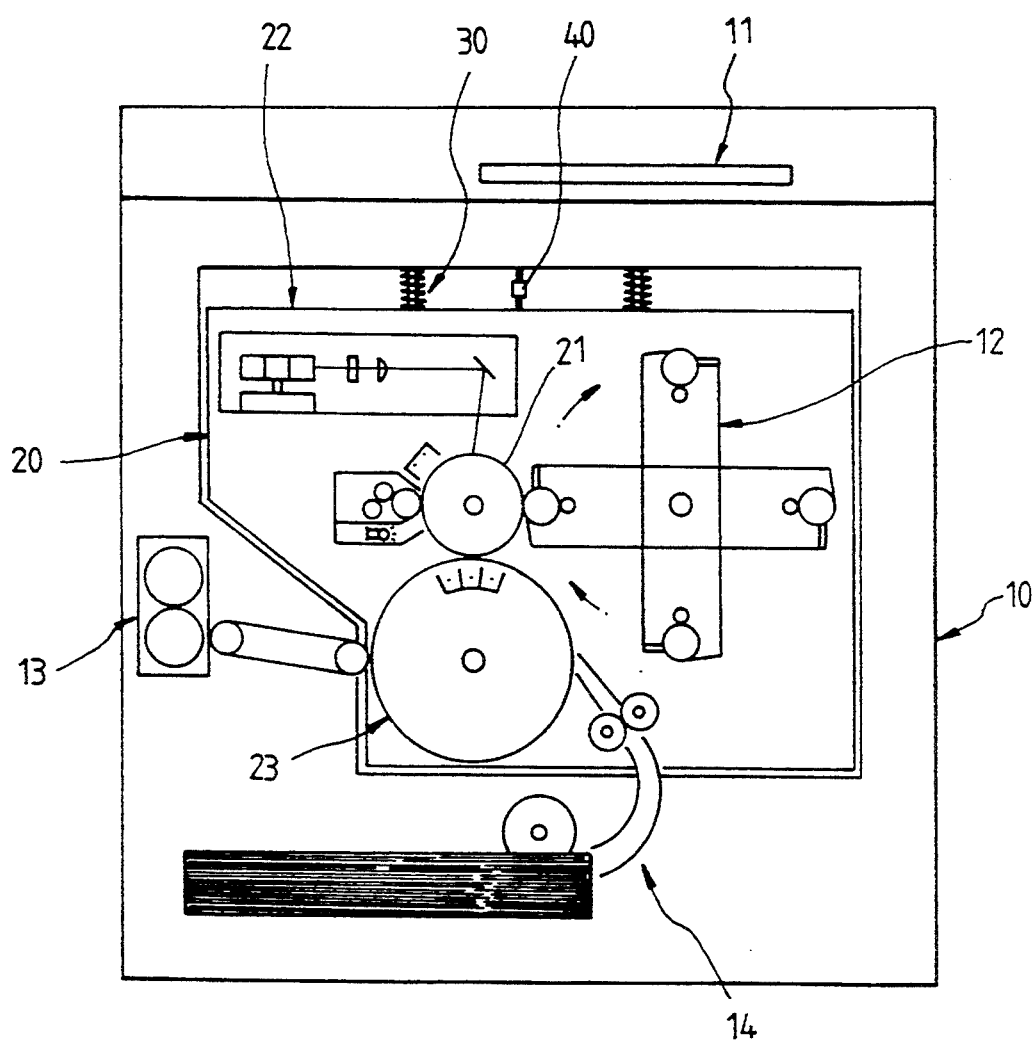
FIG. 5 is a schematic cross-sectional view of another embodiment of an image forming apparatus of the present invention.

FIG. 5 shows another embodiment of the image forming apparatus of the present invention. In FIG. 5, developing unit 12 for supplying toner to photosensitive drum 21 so as to form an image with toner is installed inside housing 20. Other components mounted on main body 10 and housing 20 are the same as those of the first embodiment, and so the detailed description of them is omitted.

Between housing 20 and main body 10 are provided a buffer 30 for absorbing the vibration created from the main body, and a damper 40 for absorbing the vibration of buffer 30. Buffer 30 is also the same as that of the first embodiment, and the detailed description of the buffer will be omitted.

In the image forming apparatus of the second embodiment of the present invention, since photosensitive drum 21, developing unit 12, laser scanning unit 22 and transfer unit 23 are installed in housing 20 which is separate from main body 10 and buffer 30 is provided between housing 20 and main body 10, less vibration due to the driving of paper carrier 14 and fixing unit 13, which are directly installed onto main body 10, is transmitted to housing 20 through main body 10.

Specifically, if buffer 30 is elastic member 35, the vibration caused by the driving of paper carrier 14 and fixing unit 13 is absorbed by elastic member 35. If buffer 30 includes buffer spring 32 and damper 33, the vibration caused by the driving of paper carrier 14 and fixing unit 13 is first reduced by buffer spring 32, and the vibration of buffer spring 32 is again attenuated by damper 40.

Accordingly, the image forming apparatus of the present invention solves a problem in which toner is scattered in the apparatus due to its vibration while the toner is supplied from the developing unit to the photosensitive drum.

As described above, since the image forming apparatus of the present invention prevents the photosensitive drum, laser scanning unit, developing unit and transfer unit from vibration caused by the driving of the developing unit, fixing unit and paper carrier which are located in the main body, the color blurring, color smearing or banding for the image, which are caused by vibration, can be minimized, to thereby enhance image quality.

What is claimed is:

1. An image forming apparatus comprising a photosensitive drum, a laser scanning unit for forming an electrostatic latent image on said photosensitive drum, a developing unit for applying a toner to the electrostatic latent image to form an image with the toner, a transfer unit for transferring the image to paper, a main body, and a housing within said main body wherein said photosensitive drum, laser scanning unit, and transfer unit are installed in the housing separate from said main body and including buffer means and a damping means positioned between and connected to said housing and said main body such that vibrations in a direction perpendicular to an axis of rotation of said photo-sensitive drum are absorbed and attenuated.

2. The image forming apparatus as claimed in claim 1 wherein said buffer means includes a buffer spring having ends fixed to said housing and said main body, respectively.

3. The image forming apparatus as claimed in claim 1 wherein said buffer means includes an elastic member interposed between said housing and said main body.

4. An image forming apparatus comprising a photosensitive drum, a laser scanning unit for forming an electrostatic latent image on said photosensitive drum, a developing unit for applying a toner to the electrostatic latent image to form an image with the toner, a transfer unit for transferring the image to paper, a main body, and a housing wherein said developing unit is installed in said housing separate from said main body and including buffer means and a damping means positioned between and connected to said housing and said main body such that vibrations in a direction perpendicular to an axis of rotation of said photo-sensitive drum are absorbed and attenuated.

5. The image forming apparatus as claimed in claim 4 wherein said buffer means includes a buffer spring having ends fixed to said housing and said main body, respectively.

6. The image forming apparatus as claimed in claim 1 wherein said buffer means includes an elastic member interposed between said housing and said main body.

* * * * *

UNITED STATES PATENT AND TRADEMARK OFFICE
CERTIFICATE OF CORRECTION

PATENT NO.   : 5,450,159
DATED        : September 12, 1995
INVENTOR(S)  : Choi et al.

It is certified that error appears in the above-indentified patent and that said Letters Patent is hereby corrected as shown below:

Column 4, Line 54, change "1" to --4--.

Signed and Sealed this

Eighteenth Day of June, 1996

Attest:

BRUCE LEHMAN

*Attesting Officer*       *Commissioner of Patents and Trademarks*